US008978156B2

(12) United States Patent
Saito (10) Patent No.: US 8,978,156 B2
(45) Date of Patent: Mar. 10, 2015

(54) INFORMATION TERMINAL AND INFORMATION LEAKAGE PREVENTION METHOD

(75) Inventor: Shunsuke Saito, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 13/451,319

(22) Filed: Apr. 19, 2012

(65) Prior Publication Data

US 2012/0317651 A1   Dec. 13, 2012

(30) Foreign Application Priority Data

Apr. 19, 2011   (JP) ................................ 2011-092700

(51) Int. Cl.
  *G06F 7/04*   (2006.01)
  *G06F 21/88*  (2013.01)
  *G06F 1/26*   (2006.01)

(52) U.S. Cl.
  CPC ........ *G06F 21/88* (2013.01); *G06F 2221/2105* (2013.01); *G06F 2221/2143* (2013.01); *G06F 2221/2149* (2013.01); *G06F 1/26* (2013.01)
  USPC ....................................................... 726/27

(58) Field of Classification Search
  CPC ... G06F 21/88; G06F 1/26; G06F 2221/2143; G06F 2221/2105
  USPC ....................................................... 726/27
  See application file for complete search history.

(56) References Cited

U.S. PATENT DOCUMENTS

| 6,741,851 | B1 * | 5/2004 | Lee et al. ............... 455/410 |
| 7,299,037 | B2 * | 11/2007 | Hospes .................. 455/419 |
| 8,208,897 | B2 * | 6/2012 | Kaneko et al. .......... 455/410 |
| 2003/0143980 | A1 * | 7/2003 | Choi et al. .............. 455/411 |
| 2006/0156052 | A1 * | 7/2006 | Bodnar et al. ............. 714/2 |
| 2007/0281664 | A1 * | 12/2007 | Kaneko et al. .......... 455/410 |
| 2008/0301820 | A1 * | 12/2008 | Stevens ................... 726/28 |
| 2009/0298468 | A1 * | 12/2009 | Hsu ......................... 455/411 |
| 2010/0210240 | A1 * | 8/2010 | Mahaffey et al. ........ 455/411 |
| 2010/0299749 | A1 * | 11/2010 | Bhansali et al. .......... 726/19 |
| 2011/0145927 | A1 * | 6/2011 | Hubner et al. ............ 726/26 |

FOREIGN PATENT DOCUMENTS

JP    08-251660    9/1996

* cited by examiner

*Primary Examiner* — Mohammad W Reza
(74) *Attorney, Agent, or Firm* — McDermott Will & Emery LLP (57) ABSTRACT

An information terminal includes: a nonvolatile storage unit which stores a flag that indicates whether or not the information terminal is in a state in which information leakage should be prevented; a start control unit which starts the information terminal and manages a power source of the information terminal; a device group which operate upon starting of the information terminal; and a device operation control unit which controls operation of at least one of the device group. The device operation control unit controls the at least one device so as to suppress operation that appeals to at least one of the five senses of human being when the flag indicates the state in which information leakage should be prevented.

9 Claims, 6 Drawing Sheets

INFORMATION TERMINAL AND INFORMATION LEAKAGE PREVENTION METHOD

CROSS REFERENCE TO RELATED APPLICATION

The present application is based on and claims priority of Japanese Patent Application No. 2011-092700 filed on Apr. 19, 2011. The entire disclosure of the above-identified application, including the specification, drawings and claims are incorporated herein by reference in its entirety.

TECHNICAL FIELD

The present invention relates to information terminals, and particularly to an information leakage prevention method in a case where an information terminal including a laptop personal computer is in a state in which information leakage should be prevented, such as when the information terminal is lost or stolen.

BACKGROUND ART

In recent years, it has become easier to carry personal information or confidential information of a company and to utilize such information anywhere, as a result of the spread of compact information terminals such as laptop personal computers, Personal Digital Assistants (PDA), and mobile phones. However, more and more information leak cases are occurring due to information terminals, such as laptop personal computers and compact information terminals, being lost or stolen.

Generally, as one of the methods for preventing information leakage from an information terminal such as a laptop personal computer or a compact information terminal which is lost or stolen, there is a method of deleting information in the terminal by remotely operating the terminal from a remote location via a wired or wireless connection (see Patent Literature (PTL) 1, for example).

In the subsystem for preventing illicit use of radio portable terminal disclosed in PTL 1, an owner of a stolen radio portable terminal issues a stolen notification from another terminal to an information center where portable terminals are administrated, and the information center wirelessly sends a system lock request to the target terminal in response to the notification. Then, the internal data on the stolen portable terminal is deleted.

Thus, a third party cannot access a wireless network nor view the internal data, such as an address list, after the portable terminal is lost or stolen. Therefore, the security of the portable terminal is maintained.

CITATION LIST

Patent Literature

[PTL 1] Japanese Unexamined Patent Application Publication No. 8-251660

SUMMARY OF INVENTION

Technical Problem

However, with the method disclosed in PTL 1, a certain time period is required to delete all of the information saved on the storage device of the information terminal such as a laptop personal computer or a compact information terminal. Therefore, there is a problem that if a third party turns off the power source of the terminal or detaches the mounted battery in the meantime, the information leakage may be caused because the data deletion may not be completed.

Particularly, when the information terminal such as a laptop personal computer or a compact information terminal is not started, the start operation is performed via a wireless connection. Therefore, a third party can easily sense that the information terminal is being started by the LCD backlight, the light emitted from various LED indicators, or the driving sound generated from the cooling fan, on start-up.

In such a situation, if the third party senses the starting of the information terminal, the third party stops the wireless function of the information terminal, and then the start operation for the information terminal via a wireless connection is disabled, whereby the data saved on the storage device of the information terminal cannot be deleted after that. As a result, the data in the storage device might be read by the third party.

Therefore, the present invention has an objective to provide an information terminal and an information leakage prevention method for reinforcing information security, including deleting data on the information terminal more certainly than in the conventional technique, when an information terminal is in a state in which information leakage should be prevented because it is lost or stolen.

Solution to Problem

In order to solve the above problems, an aspect of an information terminal according to the present invention includes: a nonvolatile storage unit which stores a flag that indicates whether or not the information terminal is in a state in which information leakage should be prevented; a start control unit which starts the information terminal and manages a power source of the information terminal; plural devices which operate upon starting of the information terminal; and a device operation control unit which controls operation of at least one of the devices. The device operation control unit controls the at least one device so as to suppress operation that appeals to at least one of five senses of human being, when the flag stored in the nonvolatile storage unit indicates the state in which information leakage should be prevented.

Advantageous Effects of Invention

With the above structure, it becomes hard for a third party to sense that the information terminal is being started to delete the data on the storage device of the information terminal, whereby it is expected that the information security can be reinforced in the case where the information terminal is lost or stolen.

BRIEF DESCRIPTION OF DRAWINGS

These and other objects, advantages and features of the invention will become apparent from the following description thereof taken in conjunction with the accompanying drawings that illustrate a specific embodiment of the present invention. In the Drawings.

DESCRIPTION OF EMBODIMENT

The following describes an embodiment and en example of an information terminal and an information leakage prevention method according to the present invention, with reference to the drawings. It is to be noted that each of the embodiment and the example described below is a preferable specific example of the present invention. Numeric values, shapes, constituents, positions and topologies of the constituents, steps, an order of the steps, a communication sequence, and the like in the following embodiment and example are an example of the present invention, and it should therefore not be construed that the present invention is determined by the embodiment and the example. The present invention is determined by the statement in Claims. Accordingly, out of the constituents in the following embodiment and example, the constituents not stated in the independent claims describing the broadest concept of the present invention are not necessary for achieving the object of the present invention and are described as optional constituents included in a more preferable embodiment.

Embodiment

First, the information terminal and the information leakage prevention method according to the embodiment of the present invention are described.

Figure 1:
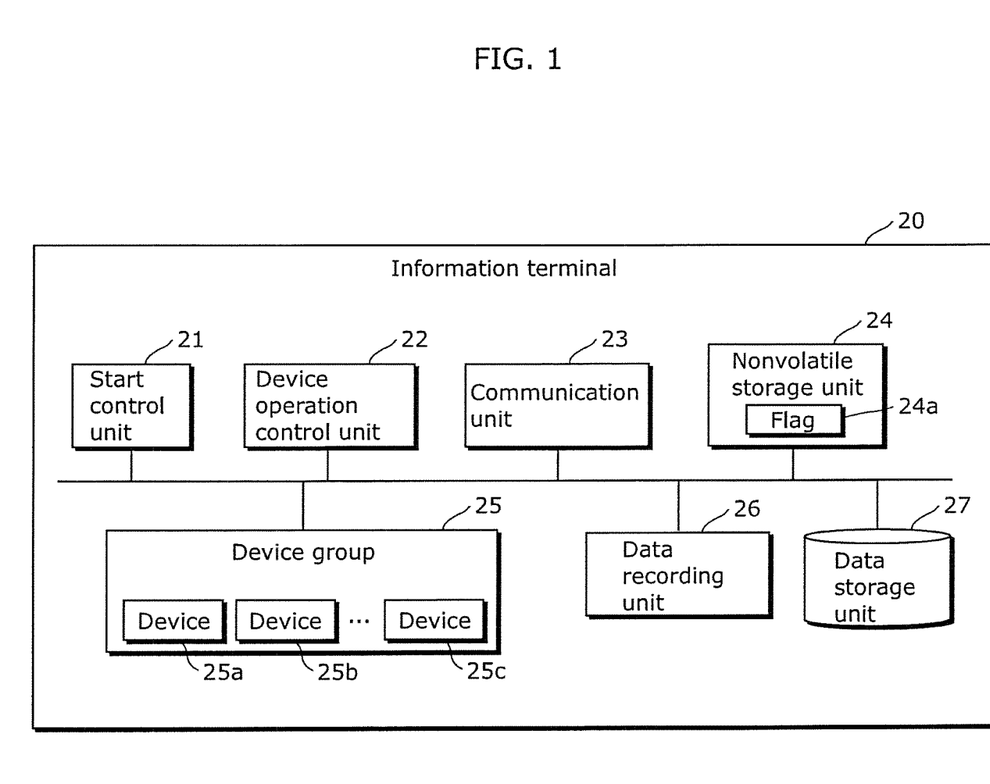
FIG. 1 is a functional block diagram of an information terminal according to an embodiment of the present invention.

FIG. 1 is a functional block diagram of an information terminal 20 according to an embodiment of the present invention. The information terminal 20 includes, as main constituents, a nonvolatile storage unit 24 which stores a flag 24a that indicates whether or not the information terminal 20 is in a state in which information leakage should be prevented, a start control unit 21 which starts the information terminal 20 and manages a power source of the information terminal 20, a device group 25 (plural devices from 25a to 25c) which operate upon starting of the information terminal 20, and a device operation control unit 22 which controls operation of at least one of the device group 25.

Here, as a characteristic operation, the device operation control unit 22 controls the at least one device so as to suppress operation that appeals to at least one of the five senses of human being when the flag 24a stored in the nonvolatile storage unit 24 indicates the state in which information leakage should be prevented. Thus, in a case where the information terminal 20 is in the state in which information leakage should be prevented because it is lost or stolen, when the information terminal 20 is automatically started to delete data inside the information terminal 20 by a remote operation command or the like, the operation performed on start-up that appeals to at least one of the five senses of human being is suppressed, whereby it is hard for a third party to sense that the information terminal 20 is being started. Accordingly, the data in the information terminal 20 can be certainly deleted.

It is to be noted that the "state in which information leakage should be prevented" stands for a state in which the information held on the information terminal should be prevented from being leaked to a person other than the owner (a third party). Example of such a state includes: when the owner has lost the information terminal (lost state); when the information terminal is stolen (stolen state); when it is required to reinforce the security of the information held on the information terminal; when it is required to delete the information held on the information terminal; and when it is required not to be sensed by a human being that the information terminal is operating. Here, "operation that appeals to at least one of the five senses of human being" stands for operation of the information terminal which may be sensed by a human being by at least one of sense of sight, hearing, taste, smell and touch. The following describes specific examples.

Here, the start control unit 21 starts or restarts the information terminal 20 when the flag is set to indicate the state in which information leakage should be prevented. The device operation control unit 22 controls the at least one device so as to suppress the operation that appeals to at least one of the five senses of human being after the starting or restarting. Thus, not only when the information terminal 20 is stopped (in a state in which the power source is turned off) but also when the information terminal 20 has been started, if the flag 24a is set to indicate the state in which information leakage should be prevented, restart is automatically performed so that the operation that appeals to at least one of the five senses of human being by the device is suppressed.

The information terminal 20 further includes a communication unit 23 which receives information via a wired or wireless connection. The device operation control unit 22 sets the flag 24a to indicate the state in which information leakage should be prevented when the communication unit 23 receives information showing that the information terminal 20 is in the state in which information leakage should be prevented (remote operation command for starting, for example).

Furthermore, the information terminal 20 further includes a data storage unit 27 which stores data, and a data recording unit 26 which records and deletes data on the data storage unit 27. The data recording unit 26 deletes the data on the data storage unit 27 when the flag 24a stored in the nonvolatile storage unit 24 indicates the state in which information leakage should be prevented. Thus, when the information terminal 20 is in the state in which information leakage should be prevented, it is possible to certainly delete the confidential information and the like held on the information terminal 20 without being sensed by a third party.

It is to be noted that the start control unit 21 turns off the power source of the information terminal 20 after the deletion of the data on the data storage unit 27 is completed.

Furthermore, the information terminal 20 has a start wait state in which the information terminal 20 waits for a starting (standby mode, for example), in addition to a normal operation state. Here, in the start wait state, the communication unit 23 is in a state in which the communication unit 23 is able to receive the information showing that the information terminal 20 is in the state in which information leakage should be prevented. That is, the communication unit 23 is supplied with power necessary for receiving. Thus, even when the power source of the information terminal 20 is turned off, upon receiving the remote operation command by the communication unit 23, the information terminal 20 is automatically started and processing for reinforcing security including data deletion can be performed.

It is to be noted that the at least one device in the device group 25 performs at least one operation from among displaying, lighting of a backlight, lighting of an LED, rotating a blast fan, emitting sound from a speaker, operating an external input and output device that is connected to an external input and output port or an external input and output slot, and receiving a user input operation, as the operation that appeals to at least one of the five senses of human being.

Here, for example, the device operation control unit 22 causes the at least one device to stop or dim the displaying, the lighting of the backlight, and the lighting of the LED, as control for suppressing the operation that appeals to at least one of the five senses of human being. Thus, in the information terminal 20, the operation that appeals to the sense of sight of a third party is suppressed, whereby the information terminal 20 is started and the data in the information terminal 20 can be deleted without being sensed by the third party.

Furthermore, the device operation control unit 22 may cause the at least one device to stop or slow down rotating the blast fan, as the control for suppressing the operation that appeals to at least one of the five senses of human being. Thus, in the information terminal 20, the operation that appeals to the sense of sight or sense of hearing of the third party is suppressed, whereby the information terminal 20 is started and the data in the information terminal 20 can be deleted without being sensed by the third party.

Furthermore, the device operation control unit 22 may cause the at least one device to stop emitting or reduce volume of the sound from the speaker, as the control for suppressing the operation that appeals to at least one of the five senses of human being. Thus, in the information terminal 20, the operation that appeals to the sense of hearing of the third party is suppressed, whereby the information terminal 20 is started and the data in the information terminal 20 can be deleted without being sensed by the third party.

Furthermore, the device operation control unit 22 may cause the at least one device to stop operating the external input and output device that is connected to the external input and output port or the external input and output slot, as the control for suppressing the operation that appeals to at least one of the five senses of human being. Thus, in the information terminal 20, the operation related to the external input and output is suppressed, whereby it becomes hard for a third party to sense that the information terminal is started and operating.

Furthermore, the device operation control unit 22 may cause the at least one device to stop receiving the user input operation, as the control for suppressing the operation that appeals to at least one of the five senses of human being. Thus, in the information terminal 20, the operation related to the input operation is suppressed, whereby it becomes hard for a third party to sense that the information terminal is started and operating.

The following describes operation of the information terminal 20 (information leakage prevention method) according to the present embodiment as structured above.

Figure 2:
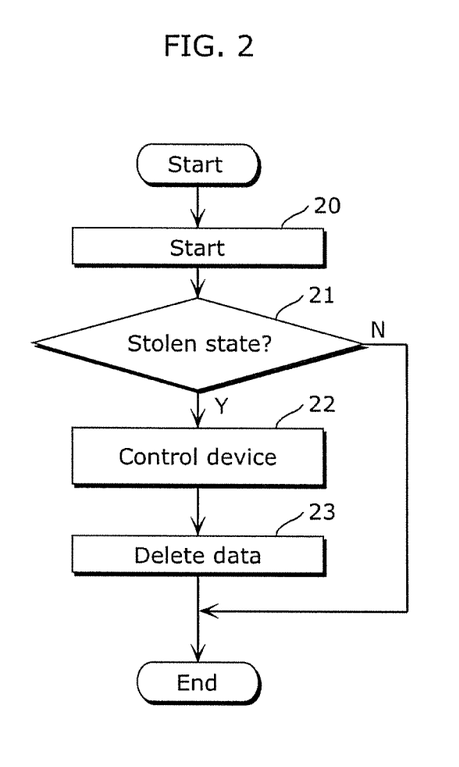
FIG. 2 is a flowchart showing operation of the information terminal according to the embodiment of the present invention.

FIG. 2 is a flowchart showing the operation of the information terminal 20 according to the embodiment of the present invention, namely, the information leakage prevention method according to the present invention.

First, the start control unit 21 starts the information terminal 20 (S20), based on the remote operation command or the like received via the communication unit 23.

Next, the device operation control unit 22 checks a value of the flag 24a stored on the nonvolatile storage unit 24 of the information terminal 20. When the result shows that the flag 24a indicates the state in which information leakage should be prevented (Y in S21), the device operation control unit 22 controls at least one device from among the device group 25 of the information terminal 20 (S22) upon starting of the information terminal 20. More specifically, the device operation control unit 22 controls the at least one device from among the device group 25 so that the device suppresses the operation that appeals to at least one of the five senses of human being, and then starts the information terminal 20.

When the communication unit 23 receives the information showing that the information terminal 20 is in the state in which information leakage should be prevented, the flag 24a is set, by the device operation control unit 22, to indicate the state in which information leakage should be prevented.

Finally, the information terminal 20 deletes the data stored on the data storage unit 27 after the information terminal 20 is started (S23). It is to be noted that the power source of the information terminal 20 is automatically (namely, by the start control unit 21) turned off after the deletion of the data is completed.

With the above operation, it is hard for the third party to sense that the information terminal 20 is being started to delete the data on the data storage unit 27. Accordingly, it is expected that the information security can be reinforced in the case where the information terminal 20 is lost or stolen.

It is to be noted that the above information leakage prevention method may be realized as a program to be executed by a computer of the information terminal. The program includes: starting the information terminal and managing a power source of the information terminal; and controlling, upon starting of the information terminal, operation of at least one of plural devices of the information terminal. In the controlling, the at least one device is controlled so as to suppress operation that appeals to at least one of the five senses of human being when a flag stored in a nonvolatile storage unit indicates a state in which information leakage should be prevented. It goes without saying that such a program may be stored on a non-transitory computer-readable recording medium for use in a computer, such as a CD-ROM.

EXAMPLE

The following describes a specific example of the above embodiment. It is to be noted that the information terminal in the present example is described using the state in which the information terminal is stolen (stolen state), as an example of the "state in which information leakage should be prevented".

[Structure of Information Terminal]

Figure 3:
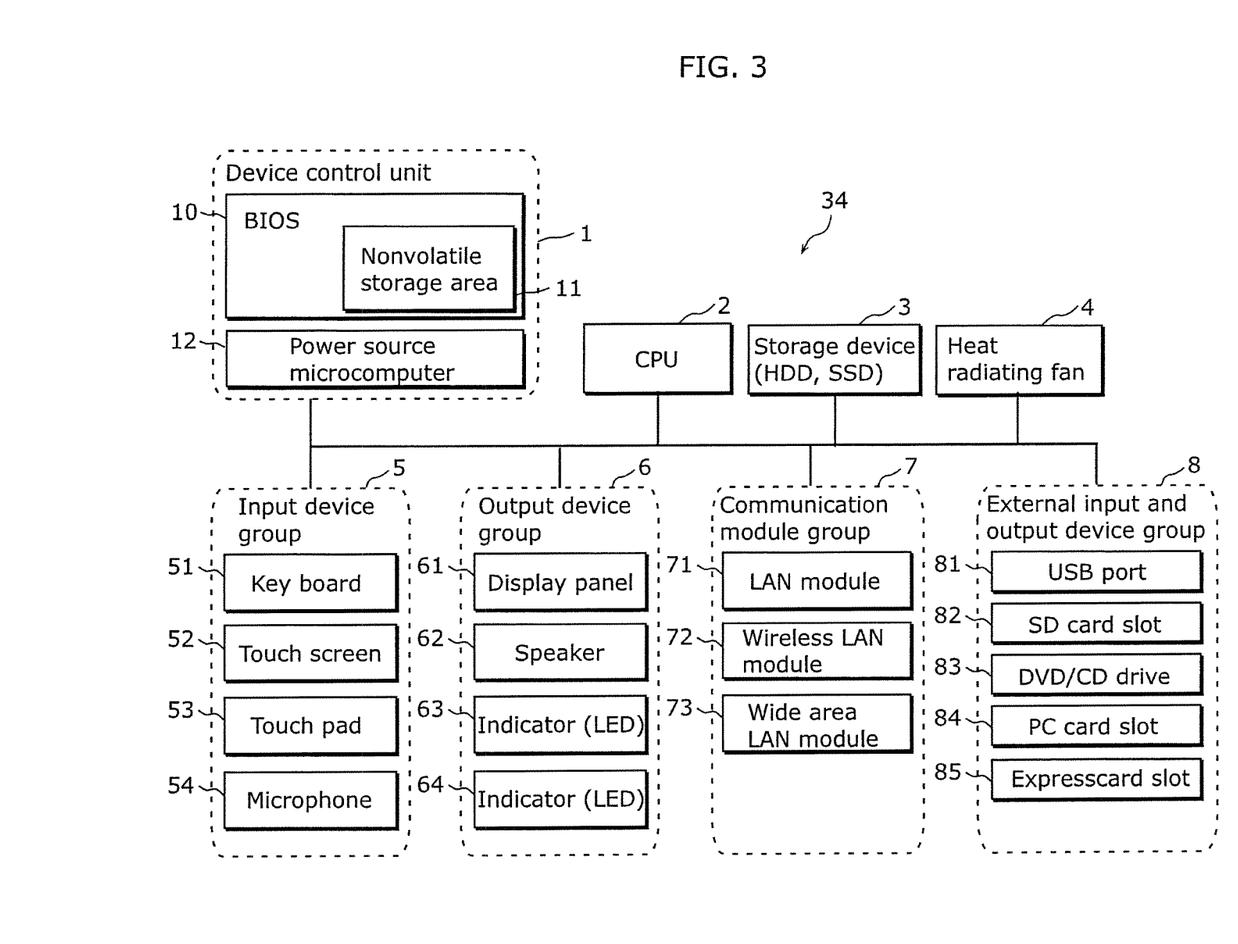
FIG. 3 is a block diagram of the information terminal according to an example of the present invention.
Figure 4:
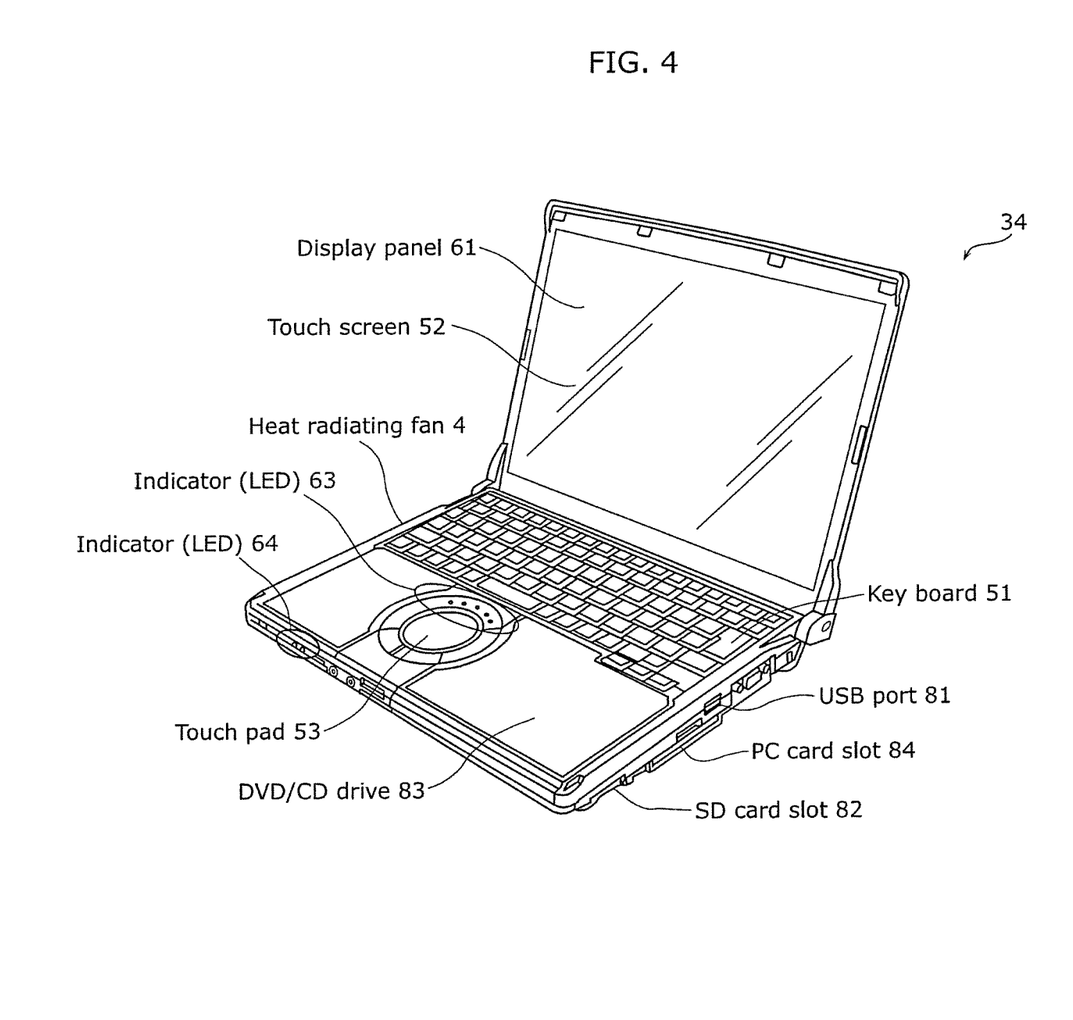
FIG. 4 is a perspective view showing an outlook of the information terminal according to the example of the present invention.

FIG. 3 shows a block diagram of an information terminal 34 according to the example of the present invention, and FIG. 4 shows the perspective view showing its outlook. The information terminal 34 is a laptop personal computer, a compact information terminal, or the like. The information terminal 34 includes a device control unit 1, an input device group 5, an output device group 6, a communication module group 7, a CPU 2 of the information terminal 34, a storage device 3 such as a hard disc drive (HDD) or a flash memory drive (SSD) on which personal information of an end user and confidential information of a company may be stored, and a heat radiating fan 4 for cooling the information terminal 34. The storage device 3 is an example of the data storage unit 27 in FIG. 1. The CPU 2 functions as the data recording unit 26 in FIG. 1 when accessing to the storage device 3. The heat radiating fan 4 is an example of the device group 25 in FIG. 1.

The device control unit 1 is an example of the device operation control unit 22 in FIG. 1, and includes a Basic Input/Output System (BIOS) 10 and a power source microcomputer 12. The BIOS 10 has a function as the start control unit 21 in FIG. 1 and includes a nonvolatile storage area 11 that is an example of the nonvolatile storage unit 24 in FIG. 1. Although the start control unit 21 in FIG. 1 is typically realized by the BIOS 10 and the power source microcomputer 12, it may be realized by a resident program not shown in the diagram in addition to or instead of the BIOS 10 and the power source microcomputer 12.

The input device group 5 is an example of the device group 25 in FIG. 1, and is an input human interface device such as a key board 51, a touch screen 52, a touch pad 53, and a microphone 54. The output device group 6 is an example of the device group 25 in FIG. 1, and is an output human interface device such as a display panel 61, a speaker 62, and LED indicators 63 and 64.

The communication module group 7 is an example of the communication unit 23 in FIG. 1, and includes modules for communication, such as a LAN module 71, a wireless LAN module 72, and a wide area wireless module 73, and the firmware. The external input and output device group 8 is an example of the device group 25 in FIG. 1, and includes a port or a device slot group for external input and output, such as a USB port 81, an SD card slot 82, a DVD/CD drive 83, a PC card slot 84, and an ExpressCard slot 85.

[Operation of Information Terminal (Processing Flow)]

Figure 5:
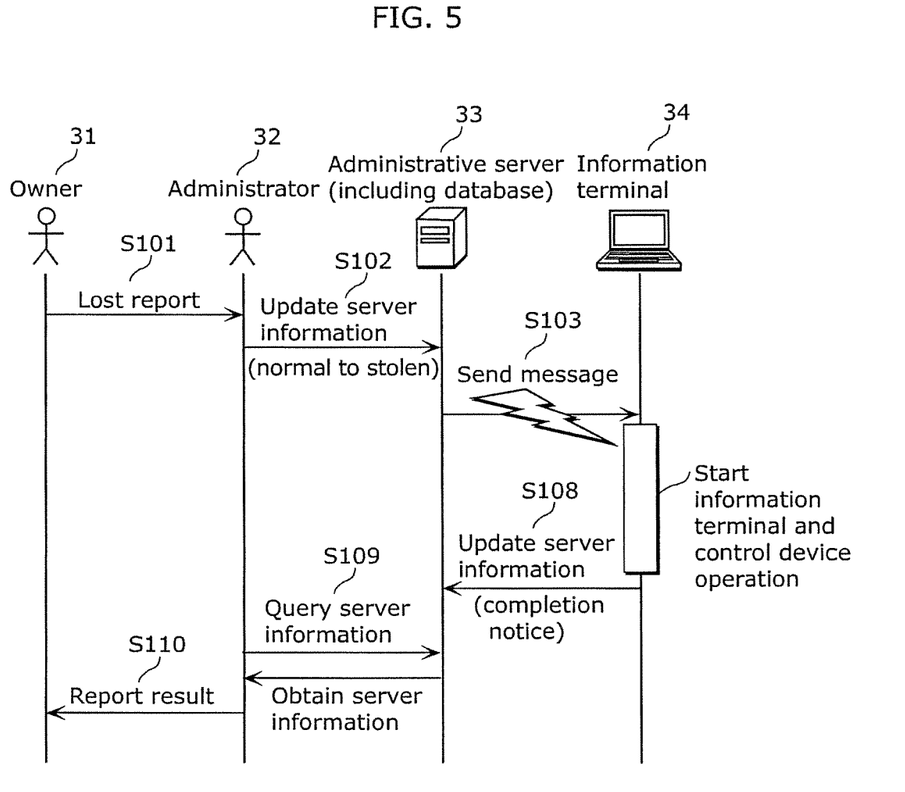
FIG. 5 is a sequence diagram showing a processing order for preventing information leakage from the information terminal according to the example of the present invention.
Figure 6:
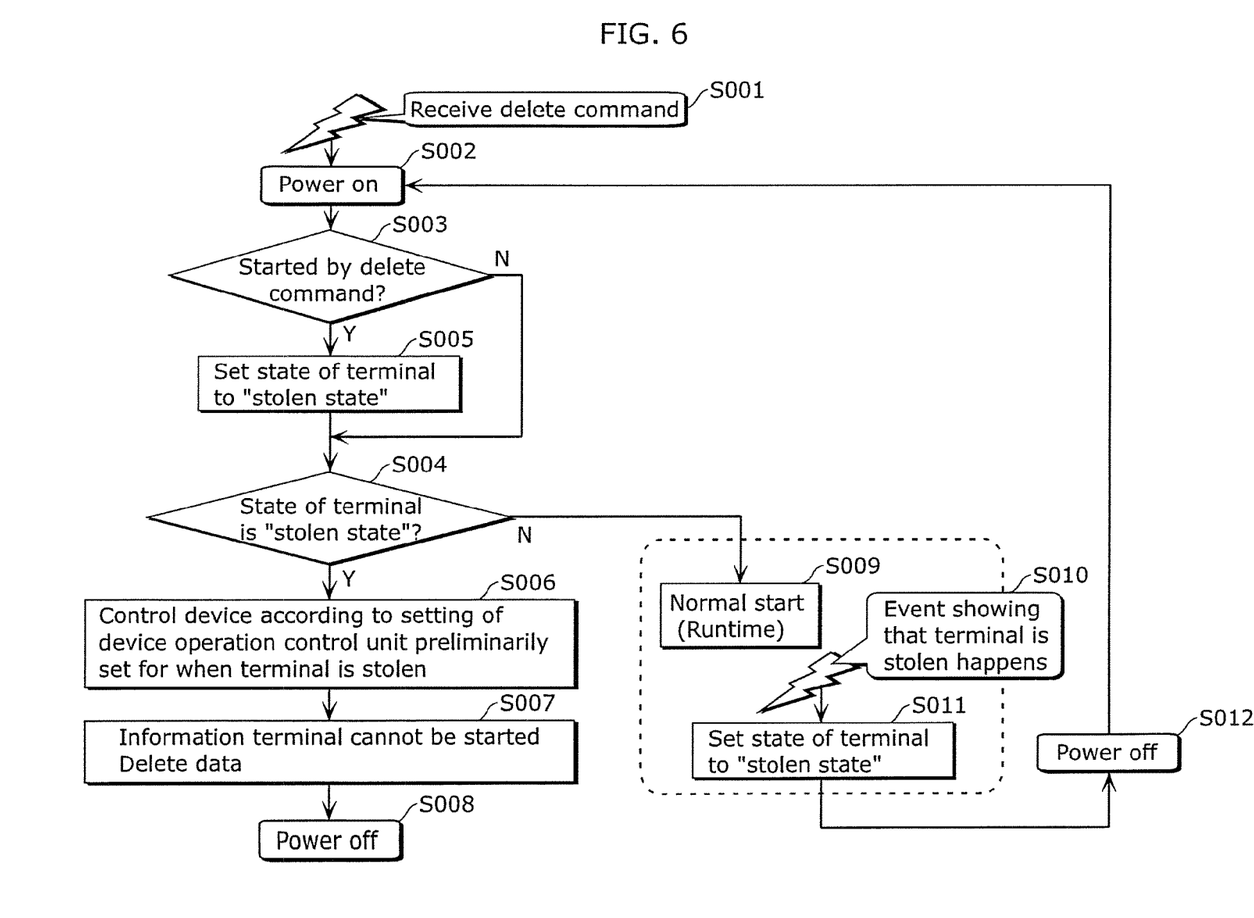
FIG. 6 is a flowchart showing operation for preventing information leakage from the information terminal according to the example of the present invention.

The following describes a flow of processing performed when the information terminal 34 structured as the above is lost or stolen, with reference to the sequence diagram shown in FIG. 5 and the flowchart shown in FIG. 6. In this example, it is assumed that the information terminal 34 is in a power-off state when it is lost.

When an owner 31 of the information terminal 34 finds that the information terminal 34 is lost or stolen, the owner 31 contacts an administrator 32 (call canter) (S101).

The administrator 32 confirms whether the person is the owner 31, connects an information terminal for operation (not shown) to an administrative server 33 using an administrative application, and operates the information terminal for operation, to update the state of the terminal of the owner on an administrative database from "normal" to "stolen state" (S102).

Using the update as a trigger, the administrative server 33 transmits, to the information terminal 34, a wide area wireless message (hereinafter also referred to as simply "message") informing that the information terminal 34 has been changed to the "stolen state" (S103). It is to be noted that the message here is an example of the "information showing that the information terminal is in the state in which information leakage should be prevented". That is, the "stolen state" is an example of the "state in which the information terminal is in the state in which information leakage should be prevented".

Upon receiving the message notifying that the information terminal 34 is changed to the "stolen state" (S001), the wide area wireless module 73 mounted in the information terminal 34 automatically turns on the power source of the information terminal 34 (S002). It is to be noted that the message here also informs that the data in the information terminal 34 is to be deleted, and is therefore also serves as a "delete command".

It is to be noted that an example of a method to automatically turn on the power source of the information terminal 34 includes: keeping the wide area wireless module 73 mounted in the information terminal 34 always supplied with power so that a message can be received; and, when a message is received by the wide area wireless module 73, driving a signal to the power source microcomputer 12 of the information terminal 34 (whereby the power source of the information terminal 34 is turned on), that is, starting or restarting the information terminal 34 by the start control unit 21.

The BIOS 10 determines whether or not the current starting is caused by the message notifying that the information terminal 34 is changed to the "stolen state" (namely, "delete command") (S003), and when the result shows that the current starting is caused by the message notifying that the information terminal 34 is changed to the "stolen state" (namely, "delete command") (Y in S003), updates the flag, that indicates the state of the terminal and is stored on the nonvolatile storage area 11 of the BIOS 10, to the "stolen state" (S005).

In contrast, when it is determined that the current starting is not caused by the delete command (N in S003), the BIOS 10 does not change but keeps the flag, that indicates the state of the terminal and is stored on the nonvolatile storage area 11, as it is.

Next, the device control unit 1 determines whether or not the flag, that indicates the state of the terminal and is stored in the nonvolatile storage area 11 of the BIOS 10, is in the "stolen state" (S004). When it is determined to be in the "stolen state" (Y in S004), the device control unit 1 controls the device (S006) according to an action setting that is preliminarily set for the stolen situation. Information for identifying the action setting for the stolen situation is stored in the nonvolatile storage area 11 of the BIOS 10. For example, when the information terminal 34 is changed to the "stolen state", the action includes: whether or not to disable the input from the key board 51; whether or not to disable the input from the touch screen 52; whether or not to disable the input from the touch pad 53; whether or not to disable the input from the microphone 54; whether or not to turn off or dim the backlight of the display panel 61; whether or not to mute or reduce volume of the sound from the speaker 62; whether or not to turn off or dim the LED indicators 63 and 64; whether or not to disable the input and output I/F of the USB port 81; whether or not to disable the input and output I/F of the SD card slot 82; whether or not to stop driving of the DVD/CD drive 83; whether or not to disable the input and output I/F of the PC card slot 84; whether or not to disable the input and output I/F of the ExpressCard slot 85; and whether or not to stop or decrease the number of rotation to slow down the heat radiating fan 4. It is to be noted that only one of the above actions may be set, or a combination of plural actions may be set.

The following are examples of the action setting for the stolen situation and the effect. When the input device group 5 is set to be disabled, input operation by the key board 51 and the touch pad 53 becomes impossible. When the device group 6 is set to be disabled, the display panel 61 and the LED indicators 63 and 64 are turned off. When the external input and output device group 8 is set to be disabled, there is no response to various storage media inserted. When the heat radiating fan 4 is set to be disabled, the rotation sound of the heat radiating fan 4 disappears. Therefore, it appears to the third party as if the information terminal 34 were powered off even when the information terminal 34 has started.

Because it is possible to make the information terminal 34 unable to start, delete the data on the storage device 3 in the information terminal 34, or perform both of the above security measures (S007) in such a state, it is hard for the third party to sense that such a security measures is being performed.

Finally, after the security measures is performed, the power source of the information terminal 34 is automatically (namely, by the start control unit 21) turned off (S008).

It is to be noted that if the performance of the above security measures should be sensed and the power source should be turned off halfway, the security measures can be performed again by using, as a trigger, the reception of the message notification S103 by the information terminal 34 or the third party's turning on the power source of the information terminal 34.

After that, the information terminal 34 does not start even when the third party turns on the power source and the input and output operation cannot be performed even if the information terminal 34 starts, whereby the data cannot be read.

Furthermore, in the case where the third party turns on the power source of the information terminal 34 before the message S107 informing that the information terminal 34 is changed to the "stolen state" is received, that is, when it is determined on start-up that the flag, that indicates the state of the terminal and is stored on the nonvolatile storage area 11 of the BIOS 10, is not in the "stolen state" (S004), the information terminal 34 starts in the normal state (S009).

Even in such a case, if the information terminal 34 itself detects that an event showing that the information terminal 34 is lost or stolen has happened (S010) during normal starting (runtime), the BIOS 10 can update the flag, that indicates the state of the terminal and is stored in the nonvolatile storage area 11 of the BIOS 10, to the "stolen state" (S011).

After that, the information terminal 34 is forcibly powered off (S012) and then restarted (S002) (the restarting is performed by the start control unit 21, for example) so that the process of the above step S006 (security measures) is started. Therefore, even in such a case, with the action setting for the stolen situation, the security measures including the deletion of the data saved in the storage device 3 can be performed in the state in which it is hard to be sensed by the third party.

It is to be noted that the event showing being stolen ("stolen event") S010 may be specified by the wide area wireless message from the administrative server 33 as in the present example, or, in some cases, the information terminal 34 itself generates such an event by periodically querying the administrative server 33 to check the administrative database held on the administrative server 33. For example, when the information showing that the information terminal 34 has been stolen is recorded in the administrative database held in the administrative server 33, the information terminal 34 may detect that it has been stolen by referring to the administrative database and generate an event showing that it is stolen.

Furthermore, in some cases, the information terminal 34 voluntarily generates a stolen event due to an internal factor using its timer or sensor. For example, a stolen event is automatically generated: when no communication has been made between a specific server over a given period; when the information terminal 34 detects, by using an acceleration sensor, that it is suddenly moved; and when the information terminal 34 detects, by using a device capable of obtaining position information, such as a GPS or a wireless access point, that it has been carried outside of a given area.

[Conclusion]

The information terminal 34 according to the present example includes a device control unit 1, a CPU 2, a storage device 3, and optionally, various devices including a heat radiating fan 4, an input device group 5, an output device group 6, a communication module group 7, an external input and output device group 8.

If the flag that indicates the state of the information terminal 34 is set to the "stolen state" (that is, the state in which information leakage should be prevented) on start-up of the terminal, according to the action setting for the stolen situation that is preliminarily set in the nonvolatile storage area 11 of the information terminal 34, the device control unit 1 performs at least one or a combination of actions. The actions include: disabling the input from the key board 51; disabling the input from the touch screen 52, disabling the input from the touch pad 53, disabling the input from the microphone 54, turning off or dimming the backlight of the display panel 61, muting or reducing volume of the sound from the speaker 62, turning off or dimming the LED indicators 63 and 64, disabling the input and output I/F of the USB port 81, disabling the input and output I/F of the SD card slot 82, stopping driving the DVD/CD drive 83, disabling the input and output I/F of the PC card slot 84, disabling the input and output I/F of the ExpressCard slot 85, stopping or decreasing the number of rotation to slow down the heat radiating fan 4.

Thus, it is possible to start the information terminal 34 without being sensed by the third party and the security measures which require a certain time period, such as deletion of the data in the storage device 3, can be performed more certainly. As a result, it is expected that the information security is reinforced.

Although the present example refers to reinforcing security by starting in a state in which it is hard to be sensed by the third party, it is expected that the security can also be reinforced by applying the present invention to an information terminal in a power-off state that is not necessarily in the stolen state. That is, the "state in which information leakage should be prevented" may include "when it is preferred that a third party cannot sense that the information terminal is started", in the present invention.

For example, it is also expected to lower the third party's defenses. It is because, by applying the control performed by the device operation control unit in the above embodiment to the LED indicator 63 of the information terminal 34 that is powered off, it becomes impossible for the third party to sense that the wide area wireless module 73 is in a standby state.

Although the information terminal and the information leakage prevention method according to the present invention are described based on the embodiment and the example, the present invention is not determined by the embodiment and the example. Embodiments obtained by applying various modifications conceived by those skilled in the art to the above embodiment and the example, or embodiments structured by arbitrarily combining constituents of the embodiment and the example, within a scope that does not deviate from the spirit of the present invention, are also included within the scope of the present invention.

INDUSTRIAL APPLICABILITY

The present invention relates to information terminals. The present invention particularly relates to prevention of information leakage for the case where an information terminal, through which important data such as personal information and confidential information of a company are communicated, is lost or stolen, and can make it harder for a third party to sense that a security function in which a certain time period is required, such as deletion of internal data, is being executed by remote operation. Therefore, the present invention can be applied to any information terminals typified by a laptop personal computer, a PDA, and a mobile phone.

The invention claimed is:

1. An information terminal comprising:
   a nonvolatile storage unit configured to store a flag that indicates whether or not said information terminal is in a state in which information leakage should be prevented;
   a start control unit configured to start said information terminal and manage a power source of said information terminal;
   a plurality of devices which operate upon starting of said information terminal;
   a device operation control unit configured to control an operation of at least one device of said plurality of devices;
   a data storage unit configured to store data; and a data recording unit configured to record and delete data on said data storage unit, wherein:

said data recording unit is configured to:

check the flag in said nonvolatile storage unit after said information terminal is automatically started from a non-operating state of said information terminal or automatically shut-down and restarted from an operating state of said information terminal, and when the checked flag indicates the state in which information leakage should be prevented, delete said data on said data storage unit, said device operation control unit is configured to, while deleting said data, lower a level of or prevent at least one operation of:

displaying an image on a display device;

lightening a backlight;

lightening an LED disposed on a body of said information terminal;

rotating a blast fan;

emitting sound from a speaker;

an external input and output device that is connected to an external input and output port or an external input and output slot; and receiving user input operation, so as not to notify a person around said information terminal of deletion of said data, when the flag stored in said nonvolatile storage unit indicates the state in which information leakage should be prevented, the information terminal further comprises a communication unit configured to receive a command indicating that said information terminal should be put in a state in which information leakage should be prevented, said start control unit is configured to:

when said communication unit receives said command during a period that said information terminal is operating, automatically shut-down and restart said information terminal; and when said communication unit receives said command during a period that said information terminal is not operating, automatically start said information terminal, and said data recording unit is configured to:

when said communication unit receives said command during a period that said information terminal is operating, check the flag stored in said nonvolatile storage unit after said information terminal is automatically shut-down and restarted; and when said communication unit receives said command during a period that said information terminal is not operating, check the flag stored in said nonvolatile storage unit after said information terminal is automatically started.

2. The information terminal according to claim 1, wherein:

the communication unit is configured to receive the command via a wired or wireless connection, and said device operation control unit is configured to set the flag to indicate the state in which information leakage should be prevented when said communication unit receives the information.

3. The information terminal according to claim 1, wherein said start control unit is configured to turn off the power source of said information terminal after the deletion of the data on said data storage unit is completed.

4. The information terminal according to claim 2, wherein said information terminal has a start wait state in which said information terminal waits for starting, and in the start wait state, said communication unit is in a state in which said communication unit is able to receive the information showing that said information terminal is in the state in which information leakage should be prevented.

5. The information terminal according to claim 1, wherein the communication unit is powered to receive the command while said information terminal is not operating.

6. An information leakage prevention method for preventing information leakage from an information terminal, said method comprising:

starting the information terminal and managing a power source of the information terminal;

controlling, upon starting of the information terminal, operation of at least one device of a plurality of devices of the information terminal;

checking a flag stored in a nonvolatile storage unit after said information terminal is automatically started from a non-operating state of said information terminal or automatically shut-down and restarted from an operating state of said information terminal; and when the checked flag stored in said nonvolatile storage unit indicates a state that information leakage should be prevented, deleting data in a data storage unit, wherein said controlling includes, while deleting said data, lowering a level of or preventing at least one operation of:

displaying an image on a display device;

lightening a backlight;

lightening an LED disposed on a body of said information terminal;

rotating a blast fan;

emitting sound from a speaker;

an external input and output device that is connected to an external input and output port or an external input and output slot; and receiving user input operation, so as not to notify a person around said information terminal of deletion of said data when the flag stored in a nonvolatile storage unit indicates a state in which information leakage should be prevented, the method further comprises receiving, via a communication unit, a command indicating that said information terminal should be put in a state in which information leakage should be prevented, when said information terminal receives said command during a period that said information terminal is operating, said information terminal is automatically shut-down and restarted and the flag is checked after said information terminal is automatically shut-down and restarted, and when said information terminal receives said command during a period that said information terminal is not operating, said information terminal is automatically started and the flag is checked after said information terminal is automatically started.

7. A non-transitory computer-readable recording medium for use in a computer, said recording medium having a computer program recorded thereon for causing the computer to execute prevention of information leakage from an information terminal, wherein said computer program, when executed by the computer, causes the computer to perform the information leakage prevention method according to claim 6.

8. A lap top personal computer comprising:

a data storage unit configured to store data;

a device control unit configured to control operations of one or more devices disposed in the lap top personal computer; and a communication unit configured to receive information via a wired or wireless connection, wherein, when the communication unit receives information indicating that the data stored in the data storage should be deleted, the device control unit is configured to, after starting from a non-operating state of said lap top personal computer or shutting-down and restarting from a non-operating state of said lap top personal computer, said lap top personal computer automatically, delete the data and, while deleting the data, to lower a level of or prevent at least one operation of:

displaying an image on a display device;
lightening a backlight;
lightening an LED disposed on a body of said lap top personal computer;
rotating a blast fan;
emitting sound from a speaker;
an external input and output device that is connected to an external input and output port or an external input and output slot; and
receiving user input operation, when said communication unit receives said information during a period that said lap top personal computer is operating, said lap top personal computer is automatically shut-down and restarted, and when said communication unit receives said information during a period that said lap top personal computer is not operating, said lap top personal computer is automatically started, and when said communication unit receives said information during a period that said information terminal is operating, the flag is checked after said lap top personal computer is automatically shut-down and restarted, and when said communication unit receives said information during a period that said lap top personal computer is not operating, the flag is checked after said lap top personal computer is automatically started.

9. The lap top personal computer according to claim 8, wherein the communication unit is powered to receive the information while said lap top personal computer is not operating.

* * * * *